(12) United States Patent
Albrecht et al.

(10) Patent No.: US 11,257,395 B2
(45) Date of Patent: *Feb. 22, 2022

(54) SYSTEMS AND METHODS TO PROVIDE WELD TRAINING

(71) Applicant: ILLINOIS TOOL WORKS INC., Glenview, IL (US)

(72) Inventors: Bruce Patrick Albrecht, Neenah, WI (US); Joseph C. Schneider, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,518

(22) Filed: May 29, 2020

(65) Prior Publication Data

US 2020/0294418 A1    Sep. 17, 2020

Related U.S. Application Data

(63) Continuation of application No. 15/400,548, filed on Jan. 6, 2017, now Pat. No. 10,672,294.

(Continued)

(51) Int. Cl.
*G09B 19/24* (2006.01)
*G09B 5/02* (2006.01)
(Continued)

(52) U.S. Cl.
CPC ........... *G09B 19/24* (2013.01); *G06F 3/0488* (2013.01); *G09B 5/02* (2013.01); *G09B 9/00* (2013.01);
(Continued)

(58) Field of Classification Search
CPC .......... G09B 19/24; B23K 9/09; B23K 9/095; B23K 9/0953
See application file for complete search history.

(56) References Cited

U.S. PATENT DOCUMENTS 4,453,085 A    6/1984   Pryor
4,482,960 A    11/1984  Pryor
(Continued)

FOREIGN PATENT DOCUMENTS

CN    1866317    11/2006
CN    1919516    2/2007
(Continued)

OTHER PUBLICATIONS

Arvika Forum Vorstellung Projeckt PAARA, BMW Group Virtual Reality Center, Nuernberg, 2003.

(Continued)

*Primary Examiner* — Robert J Utama
(74) *Attorney, Agent, or Firm* — McAndrews, Held & Malloy, Ltd.

(57) ABSTRACT

An example weld training system includes a computing device comprising a display device on a first side and a camera on a second side, the computing device configured to: capture images with the camera; process the captured images to identify a first simulation device as a simulation weld torch and a second simulation device as a simulation workpiece; and display images of a simulated welding operation on the display device of the computing device based on analyzing the captured images to detect indicia of weld performance, the images of the simulated welding operation reflecting the indicia of weld performance; and a mounting device configured to removably hold the computing device to orient the camera of the computing device toward a simulation area.

19 Claims, 10 Drawing Sheets

Related U.S. Application Data

(60) Provisional application No. 62/276,290, filed on Jan. 8, 2016.

(51) Int. Cl.
  *G09B 9/00* (2006.01)
  *H04N 13/204* (2018.01)
  *H04N 13/302* (2018.01)
  *G06F 3/0488* (2013.01)

(52) U.S. Cl.
  CPC ......... *H04N 13/204* (2018.05); *H04N 13/302* (2018.05)

(56) References Cited

U.S. PATENT DOCUMENTS

| | | |
|---|---|---|
| 4,602,163 A | 7/1986 | Pryor |
| 4,654,949 A | 4/1987 | Pryor |
| 4,753,569 A | 6/1988 | Pryor |
| 4,769,700 A | 9/1988 | Pryor |
| 4,788,440 A | 11/1988 | Pryor |
| 5,148,591 A | 9/1992 | Pryor |
| 5,506,682 A | 4/1996 | Pryor |
| 5,602,967 A | 2/1997 | Pryor |
| 5,608,847 A | 3/1997 | Pryor |
| 5,956,417 A | 9/1999 | Pryor |
| 6,044,183 A | 3/2000 | Pryor |
| 6,051,805 A | 4/2000 | Vaidya |
| 6,107,601 A | 8/2000 | Shimagama |
| 6,163,946 A | 12/2000 | Pryor |
| 6,167,607 B1 | 1/2001 | Pryor |
| 6,230,327 B1 | 5/2001 | Briand |
| 6,271,500 B1 | 8/2001 | Hirayama |
| 6,301,763 B1 | 10/2001 | Pryor |
| 6,314,631 B1 | 11/2001 | Pryor |
| 6,315,186 B1 | 11/2001 | Friedl |
| 6,317,953 B1 | 11/2001 | Pryor |
| 6,441,342 B1 | 8/2002 | Hsu |
| 6,476,354 B1 | 11/2002 | Jank |
| 6,479,793 B1 | 11/2002 | Wittmann |
| 6,750,428 B2 | 6/2004 | Okamoto |
| 7,358,458 B2 | 4/2008 | Daniel |
| 7,523,069 B1 | 4/2009 | Friedl et al. |
| 8,144,193 B2 | 3/2012 | Melikian |
| 8,274,013 B2 | 9/2012 | Wallace |
| 8,428,926 B2 | 4/2013 | Choquet |
| 8,512,043 B2 | 8/2013 | Choquet |
| 8,569,646 B2 | 10/2013 | Daniel |
| 8,648,903 B2 | 2/2014 | Loipetsberger |
| 8,657,605 B2 | 2/2014 | Wallace |
| 8,680,432 B2 | 3/2014 | Uecker |
| 8,680,434 B2 | 3/2014 | Stoger et al. |
| 8,747,116 B2 | 6/2014 | Zboray et al. |
| 8,777,629 B2 | 7/2014 | Kreindl |
| 8,834,168 B2 | 9/2014 | Peters |
| 8,851,896 B2 | 10/2014 | Wallace |
| 8,884,177 B2 | 11/2014 | Daniel |
| 8,911,237 B2 | 12/2014 | Postlethwaite |
| 8,915,740 B2 | 12/2014 | Zboray |
| 8,987,628 B2 | 3/2015 | Daniel et al. |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,073,138 B2 | 7/2015 | Wills |
| 9,089,921 B2 | 7/2015 | Daniel |
| 9,101,994 B2 | 8/2015 | Albrecht |
| 9,104,195 B2 | 8/2015 | Daniel |
| 9,196,169 B2 | 11/2015 | Wallace |
| 9,218,745 B2 | 12/2015 | Choquet |
| 9,221,117 B2 | 12/2015 | Conrardy |
| 9,230,449 B2 | 1/2016 | Conrardy |
| 9,269,279 B2 | 2/2016 | Penrod et al. |
| 9,280,913 B2 | 3/2016 | Peters |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,352,411 B2 | 5/2016 | Batzler |
| 9,368,045 B2 | 6/2016 | Becker |
| 9,468,988 B2 | 10/2016 | Daniel |
| 9,483,959 B2 | 11/2016 | Wallace |
| 9,583,014 B2 | 2/2017 | Becker |
| 9,583,023 B2 | 2/2017 | Becker et al. |
| 9,589,481 B2 | 3/2017 | Becker et al. |
| 2006/0090135 A1 | 4/2006 | Fukuda |
| 2009/0231423 A1 | 9/2009 | Becker |
| 2010/0048273 A1 | 2/2010 | Wallace |
| 2010/0062406 A1* | 3/2010 | Zboray ............... G09B 19/003 434/234 |
| 2010/0079356 A1 | 4/2010 | Hoellwarth |
| 2011/0006047 A1 | 1/2011 | Penrod |
| 2011/0083241 A1 | 4/2011 | Cole |
| 2011/0117527 A1 | 5/2011 | Conrardy |
| 2012/0006800 A1 | 1/2012 | Ryan |
| 2012/0180180 A1 | 7/2012 | Steve |
| 2012/0189993 A1 | 7/2012 | Kindig |
| 2013/0163090 A1 | 6/2013 | Yu |
| 2013/0189658 A1 | 7/2013 | Peters |
| 2013/0200882 A1 | 8/2013 | Almalki |
| 2013/0206741 A1 | 8/2013 | Pfeifer |
| 2013/0252214 A1 | 9/2013 | Choquet |
| 2013/0288211 A1 | 10/2013 | Patterson |
| 2014/0014638 A1 | 1/2014 | Artelsmair |
| 2014/0017642 A1 | 1/2014 | Postlethwaite |
| 2014/0042135 A1 | 2/2014 | Daniel et al. |
| 2014/0042136 A1 | 2/2014 | Daniel et al. |
| 2014/0042137 A1 | 2/2014 | Daniel et al. |
| 2014/0065584 A1 | 3/2014 | Wallace |
| 2014/0205976 A1 | 7/2014 | Peters |
| 2014/0220522 A1 | 8/2014 | Peters |
| 2014/0234813 A1 | 8/2014 | Peters |
| 2014/0263224 A1 | 9/2014 | Becker |
| 2014/0263227 A1 | 9/2014 | Daniel et al. |
| 2014/0272835 A1* | 9/2014 | Becker ............... B23K 9/0953 434/234 |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |
| 2014/0322684 A1 | 10/2014 | Wallace |
| 2014/0346158 A1 | 11/2014 | Matthews |
| 2014/0349256 A1 | 11/2014 | Connor |
| 2015/0034618 A1 | 2/2015 | Langeder |
| 2015/0056584 A1 | 2/2015 | Boulware |
| 2015/0056585 A1 | 2/2015 | Boulware |
| 2015/0072323 A1 | 3/2015 | Postlethwaite |
| 2015/0125836 A1 | 5/2015 | Daniel |
| 2015/0154884 A1 | 6/2015 | Salsich |
| 2015/0170539 A1* | 6/2015 | Chica Barrera ....... G09B 19/24 434/234 |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | DeLisio |
| 2015/0228203 A1 | 8/2015 | Kindig |
| 2015/0235565 A1 | 8/2015 | Postlethwaite |
| 2015/0248845 A1 | 9/2015 | Postlethwaite |
| 2015/0264992 A1 | 9/2015 | Happel |
| 2015/0268663 A1 | 9/2015 | Daniel et al. |
| 2015/0320601 A1* | 11/2015 | Gregg ............... G06T 5/008 345/8 |
| 2015/0325153 A1 | 11/2015 | Albrecht |
| 2015/0348439 A1 | 12/2015 | Zboray |
| 2015/0348441 A1 | 12/2015 | Zboray |
| 2015/0356888 A1 | 12/2015 | Zboray |
| 2015/0375324 A1 | 12/2015 | Becker |
| 2015/0375327 A1 | 12/2015 | Becker |
| 2015/0379894 A1 | 12/2015 | Becker |

(56) References Cited

U.S. PATENT DOCUMENTS

| | | | |
|---|---|---|---|
| 2016/0012750 A1 | 1/2016 | Wallace | |
| 2016/0039034 A1 | 2/2016 | Becker | |
| 2016/0039053 A1 | 2/2016 | Becker | |
| 2016/0049085 A1 | 2/2016 | Beeson | |
| 2016/0093233 A1 | 3/2016 | Boulware | |
| 2016/0114418 A1 | 4/2016 | Jones | |
| 2016/0125592 A1 | 5/2016 | Becker et al. | |
| 2016/0125593 A1 | 5/2016 | Becker | |
| 2016/0125594 A1 | 5/2016 | Becker | |
| 2016/0125653 A1* | 5/2016 | Denis | B23K 9/0956 348/90 |
| 2016/0125761 A1 | 5/2016 | Becker | |
| 2016/0125762 A1 | 5/2016 | Becker | |
| 2016/0125763 A1 | 5/2016 | Becker | |
| 2016/0125764 A1 | 5/2016 | Becker | |
| 2016/0155358 A1 | 6/2016 | Zboray | |
| 2016/0155359 A1 | 6/2016 | Zboray | |
| 2016/0155360 A1 | 6/2016 | Zboray et al. | |
| 2016/0155361 A1 | 6/2016 | Peters | |
| 2016/0171906 A1 | 6/2016 | Matthews | |
| 2016/0189559 A1 | 6/2016 | Peters | |
| 2016/0203732 A1 | 7/2016 | Wallace | |
| 2016/0203733 A1 | 7/2016 | Wallace | |
| 2016/0203734 A1 | 7/2016 | Boulware | |
| 2016/0203735 A1 | 7/2016 | Boulware | |
| 2016/0236303 A1 | 8/2016 | Matthews | |
| 2016/0267806 A1* | 9/2016 | Hsu | B23K 9/32 |
| 2016/0288236 A1 | 10/2016 | Becker | |
| 2016/0307460 A1 | 10/2016 | Peters | |
| 2016/0321954 A1 | 11/2016 | Peters | |
| 2016/0343268 A1 | 11/2016 | Postlethwaite | |
| 2016/0358503 A1 | 12/2016 | Batzler | |
| 2016/0361774 A9 | 12/2016 | Daniel et al. | |
| 2016/0365004 A1 | 12/2016 | Matthews | |
| 2017/0046974 A1 | 2/2017 | Becker | |
| 2017/0046977 A1 | 2/2017 | Becker | |
| 2017/0046982 A1 | 2/2017 | Wallace | |

FOREIGN PATENT DOCUMENTS

| | | |
|---|---|---|
| CN | 101587659 | 11/2009 |
| CN | 201364652 Y | 12/2009 |
| CN | 202210364 U | 5/2012 |
| CN | 202741926 | 2/2013 |
| CN | 203338594 U | 12/2013 |
| CN | 103942903 A | 7/2014 |
| CN | 103996322 | 8/2014 |
| CN | 104471629 | 3/2015 |
| CN | 104603860 | 5/2015 |
| CN | 104708174 | 6/2015 |
| CN | 105160645 | 12/2015 |
| EP | 2801966 | 11/2014 |
| WO | 2005102230 | 11/2005 |
| WO | 2009146359 | 12/2009 |

OTHER PUBLICATIONS

Fite-Georgel, Pierre; "Is there a Reality in Industrial Augmented Reality?" 10th IEEE International Symposium on Mixed and Augmented Reality (ISMAR), 2011.

Int'l Search Report and Written Opinion Application No. PCT/US2017/012558 dated Mar. 23, 2017 (12 pages).

Klinker, Gudrun, Intelligent Welding Gun, 2002.

Mrovlje, etal. "Distance measuring based on stereoscopic pictures". 9th International PhD Workshop on Systems and Control: Young Generation Viewpoint 1.-3. Oct. 2008, Izola, Slovenia (Year: 2008).

NAMeS Users Guide, N A Tech Neural Applications, Copyright 1997, 1998, 1999, 2000 Golden, CO (123 pages).

Native American Technologies, "ArcSentry Weld Quality Monitoring System" web page, http://web.archive.org/web/20020608124903/http://www.natech-inc.com/arcsentry1/i ndex.html, published Jun. 8, 2002.

Native American Technologies, "P/NA.3 Process Modelling and Optimization" web pages, http://web.archive.org/web/20020608125619/http://www.natech-inc.com/pna3/index.h tml, published Jun. 8, 2002.

Petrovai etal, "A stereovision based approach for detecting and tracking lane and forward obstacles on mobile devices". 2015 IEEE Intelligent Vehicles Symposium (IV) Jun. 28-Jul. 1, 2015. COEX, Seoul, Korea (Year: 2015).

Rehm Welding Technology, Invertig.Pro Digital, Sep. 16, 2013.

Rehm Welding Technology, Product Range, Aug. 2013.

Sandor, C., Klinker, G., A rapid prototyping software infrastructure for user interfaces in ubiquitous augmented reality, Pers Ubiquit Compu (2005) 9 169-185.

Tig Welder How to Play, www.tradesgamer.com, Nov. 17, 2011.

Wang et al. "Stereo vision-based depth of field rendering on a mobile device". Journal of Electronic Imaging 23(2), 023009 (Mar.-Apr. 2014) (Year: 2014).

* cited by examiner

SYSTEMS AND METHODS TO PROVIDE WELD TRAINING

RELATED APPLICATIONS

The application arises from a continuation application of U.S. patent application Ser. No. 15/400,548, filed Jan. 6, 2017, entitled "Systems and Methods to Provide Weld Training," and claims priority to U.S. Provisional Patent Application Ser. No. 62/276,290, filed Jan. 8, 2016, entitled "Weld Training Systems and Methods." The entirety of U.S. Provisional Patent Application Ser. No. 62/276,290 is incorporated herein by reference.

BACKGROUND

Weld training systems are used to provide training to welders who are unfamiliar with welding and/or with certain aspects of welding. Conventional weld training systems include suites of sensors and/or have very precise positioning requirements to ensure proper tracking of training.

BRIEF SUMMARY

Systems and methods are provided for weld training, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
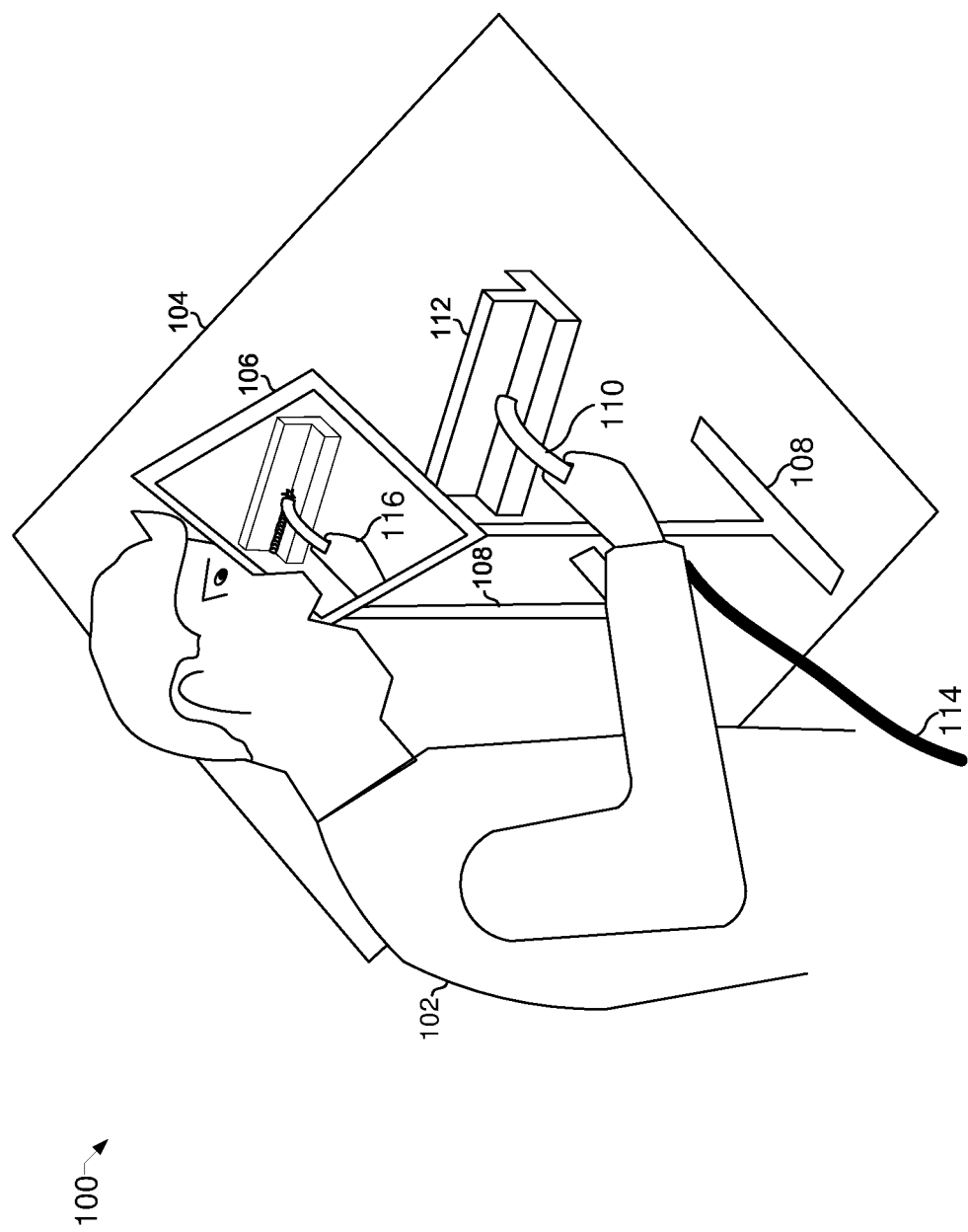
FIG. 1 is a diagram illustrating an example weld training system in accordance with aspects of this disclosure.

"Realistic" weld training systems that provide feedback to trainee welders have made great advancements in recent years. However, such realistic weld training systems can be very costly. Disclosed examples are capable of providing low cost or no cost weld training by using a reduced-complexity weld training system to teach fundamental concepts of welding for which a high degree of realism offered by conventional weld training systems is unnecessary.

Disclosed example weld training systems use commonly-available computing devices containing a display and one or more cameras to simulate the proper setup of welding equipment and simulate weld techniques while providing feedback by analyzing images captured using the one or more cameras. In some examples, a weld training system may be implemented using an application downloaded onto a computing device such as a tablet computer or a smartphone, a mounting device to hold the computing device in a desired orientation, and a real or model welding torch. In some examples, a real or model welding coupon may also be used as the workpiece for a training weld. In some other examples, the computing device may be used with actual welding equipment, where the computing device is positioned between the welder's eyes and the workpiece so as to obstruct the arc from the user's eyes.

Disclosed examples calculate and depict, in real-time and based on analyzing images captured through the camera, welding events such as spatter, burn back, burn-through, stubbing, and/or any other welding events based on measured and calculated performance of the weld. In some examples the welding events are also determined and based on the appropriateness of the selected weld parameters to the type of weld being performed.

Disclosed example weld training systems include a computing device having a display device on a first side and a camera on a second side. The computing device is configured to capture images with the camera and process the captured images to identify a first simulation device as a simulation weld torch and a second simulation device as a simulation workpiece. The computing device is further configured to display images of a simulated welding operation on the display device of the computing device, based on analyzing the captured images to detect indicia of weld performance. The images of the simulated welding operation reflect the indicia of weld performance.

Disclosed example non-transitory machine readable storage media store machine readable instructions may be executed by a processor of a computing device having a display device on a first side and a camera on a second side. The instructions cause the computing device to capture images using the camera and process the captured images to identify a first simulation device as a simulation weld torch and a second simulation device as a simulation workpiece. The instructions also cause the processor to display images of a simulated welding operation on the display device based on analyzing the captured images to detect indicia of weld performance. The images of the simulated welding operation reflect the indicia of weld performance.

Some examples further include a mounting device that holds the computing device to orient the camera of the computing device toward a simulation area. In some examples, the mounting device orients the display device of the computing device away from the simulation area. In some examples, the mounting device orients the display device such that a user of the first simulation device is facing the simulation area.

In some examples, the display device presents stereoscopic images. In some such examples, the mounting device includes one or more lenses to provide a stereoscopic view of the stereoscopic images. In some examples, the computing device recognizes when the computing device is connected to the mounting device. In some examples, the mounting device includes a protective housing to prevent damage to the computing device from an actual weld.

In some examples, the processing of the captured images includes calculating a distance between the first simulation device and the second simulation device. In some such examples, displaying the images of the simulated welding operation is based on the calculated distance as the indicia of weld performance. In some examples, the computing device enables selection of one or more weld variables. In some such examples, the computing device depicts welding events including at least one of spatter, burn back, burn-through, or wire stubbing, based on at least one of the indicia of weld performance or the one or more weld variables. In some examples, the computing device enables the selection of the one or more weld variables with at least one of a weld calculator view or a weld equipment view.

In some examples, the computing device processes the captured images based on input from a sensor of the computing device. In some such examples, the sensor includes at least one of an accelerometer, a magnetometer, a microphone, or an ambient light sensor.

Some examples include a plurality of cameras configured to capture images substantially simultaneously. In some examples, the computing device is a smartphone or a tablet computer. In some examples, the computing device processes the captured images without using additional sensors. In some examples, the camera generates stereoscopic images and the display device displays the stereoscopic images. In some examples, the indicia of weld performance comprise at least one of aim, travel speed, work angle, travel angle, or contact tip to work distance.

As used herein, the term "real-time" refers to performance of a process or other action relating to a system in which input data is processed substantially immediately (e.g., within milliseconds, as soon as possible, etc.) so that the result of processing is available virtually immediately as feedback. In this regard, "real-time" is used on contradistinction to post-processing.

FIG. 1 is a diagram illustrating a weld training system in accordance with an example implementation of this disclosure. Shown is a computing device 106 (e.g., tablet or smartphone) situated in a mounting device 108 which holds the screen of the computing device 106 at a position and angle that is comfortable for the welder 102 to view as he performs a (real or simulated) weld on the workpiece 112 (a real metal coupon for a real weld, or a plastic coupon for a simulated weld) using (real or mock) welding torch 110 connected to cables 114.

The mounting device 108 is configured to hold the computing device 106 to orient a camera of the computing device 106 toward a simulation area 104 (e.g., toward the workpiece 112). The mounting device 108 also orients a display device of the computing device 106 away from the simulation area 104. The mounting device 108 may orient the display device such that a user of the welding torch 110 is facing the simulation area 104. The computing device 106 may be configured to recognize when the computing device 106 is connected to or mounted in the mounting device 108. For example, the mounting device 108 may trigger one or more inputs in the computing device 106 via magnets and/or capacitively charged elements that are recognized by corresponding sensors in the computing device 106.

For use with a real weld, the mounting device 108 may comprise a protective shield (e.g., glass, plastic, or air curtain) to protect the computing device from spatter, heat, etc.). Alternatively, the computing device 106 may be ruggedized (e.g., by a case which it goes in before being placed in the mount).

The position of the torch 110 and workpiece 112 in three-dimensional space is determined from images captured by a camera of the computing device 106, images from a camera of the mount (e.g., received by the computing device via USB, HDMI, or the like), and/or from output (e.g., conveyed wirelessly to the computing device 106 from one or more sensors mounted on the torch 110, workpiece 112, and/or simulation area 104. For both a simulated and real weld, this position information may be used to monitor the welder's technique (e.g., aim, speed, work angle, travel angle, contact tip to work distance, and/or other parameters). For a simulated weld operation, this position information may be used to generate a simulated arc and/or simulated bead.

As described in more detail below, the welder 102 may input parameters such as power source voltage, current, workpiece metal/thickness, and/or the like via a human machine interface (e.g., touchscreen, pressure-sensitive touchscreen, gestures captured by a forward facing camera of the computing device 106, and/or the like) of the computing device 106. These parameters may be used for monitoring the quality of the weld/assessing the technique of the welder 102. For a simulated weld operation, these parameters may be used for rendering a simulated arc and/or simulated bead. The welder 102 may select a profile for storing the welder's results of the training session to track progress over time.

For an actual weld operation, the system may deal with the extremely high contrast resulting from the presence of the weld arc in a variety of ways. For example, the computing device 106 may be operable to perform a variety of image processing techniques to provide an HDR mode such that, viewing the screen of the computing device while welding, the welder 102 can clearly see, simultaneously, the workpiece in close proximity to the arc (e.g., can see the weld puddle) and relatively far from the arc. This is in contrast to viewing the workpiece/arc directly with protective eyewear because when the arc is on, the eyewear is too dark to see well in areas that are not very brightly lit by the arc. The example computing device 106 may serve as an eye protection device in lieu of a welding helmet when placed between the arc of an actual weld and the user's eyes.

In some examples, the computing device 106 presents a three-dimensional or stereoscopic image. This may either be with the aid of 3D glasses or other lens (which may also be designed to meet requirements as protective eyewear for welding) or the display may be autostereoscopic. For example, the mounting device 108 may include one or more lenses to provide a stereoscopic view of stereoscopic images present on the computing device 106.

In some examples, the welding system 100 may switch between simulated welding mode and real welding mode via an input to a human machine interface. In this manner, the welder 102 can do a practice run and then very quickly switch to a real weld once s/he has a "feel" for the weld.

The mounting device 108 may be such that the computing device 106 is easily inserted and removed and/or repositioned within the mounting device 108. Although the mounting device 108 is shown attached to a workbench or table in the simulation area 104, it may be easily removable and re-mounted elsewhere (e.g., using clamps, magnets, that can be manipulated while wearing welding gloves and not requiring any tools). For example, the mounting device 108 may be adapted to permit mounting to different workstations (including different workstations of different sizes shapes, etc.), to welding equipment (e.g., power source, wire feeder, welding torch, welding robot, etc.), and/or to a workpiece itself.

In some examples, sensor information from the computing device 106 (e.g., images from its camera, outputs from its accelerometer, gyroscope, etc.) may be communicated to another computing device, such as a computing device integrated into the welder's helmet. For example, the welding helmet may comprise a near-to-eye display and data from the computing device 106 may be wirelessly communicated to the helmet and presented on the near-to-eye display of the helmet. Similarly, the display of the helmet may augment the display on the computing device 106. For example, the display in the helmet may display parameters captured by the accelerometer/gyroscope/etc. of the computing device 106 while the display of the computing device is fully allocated to presenting the images captured by its camera. As another example, a graphical user interface for interacting with the computing device may be presented on a display of the welder's helmet, a wristband, and/or the like. Similarly, a graphical user interface for interacting with/controlling, during a real or simulated weld operation, the welder's helmet, the welder's wristband, a welding power source, wire feeder, gas cylinder, welding robot, and/or the like may be presented on the display of the computing device 106.

The computing device 106 may generate a stereoscopic image such that, by changing the angle at which s/he looks at the display, the welder can see different angles of the torch/workpiece etc., just as if looking directly at the physical workpiece.

The computing device 106 may include a front facing camera that track the welder's head and/or eyes, and may analyze the images captured by the front facing camera to change the view of the simulated workpiece such that the 2 dimensional image moves along with movements of the welder's eyes and/or head to simulate the welder getting a different view of the weld operation in progress.

Figure 2:
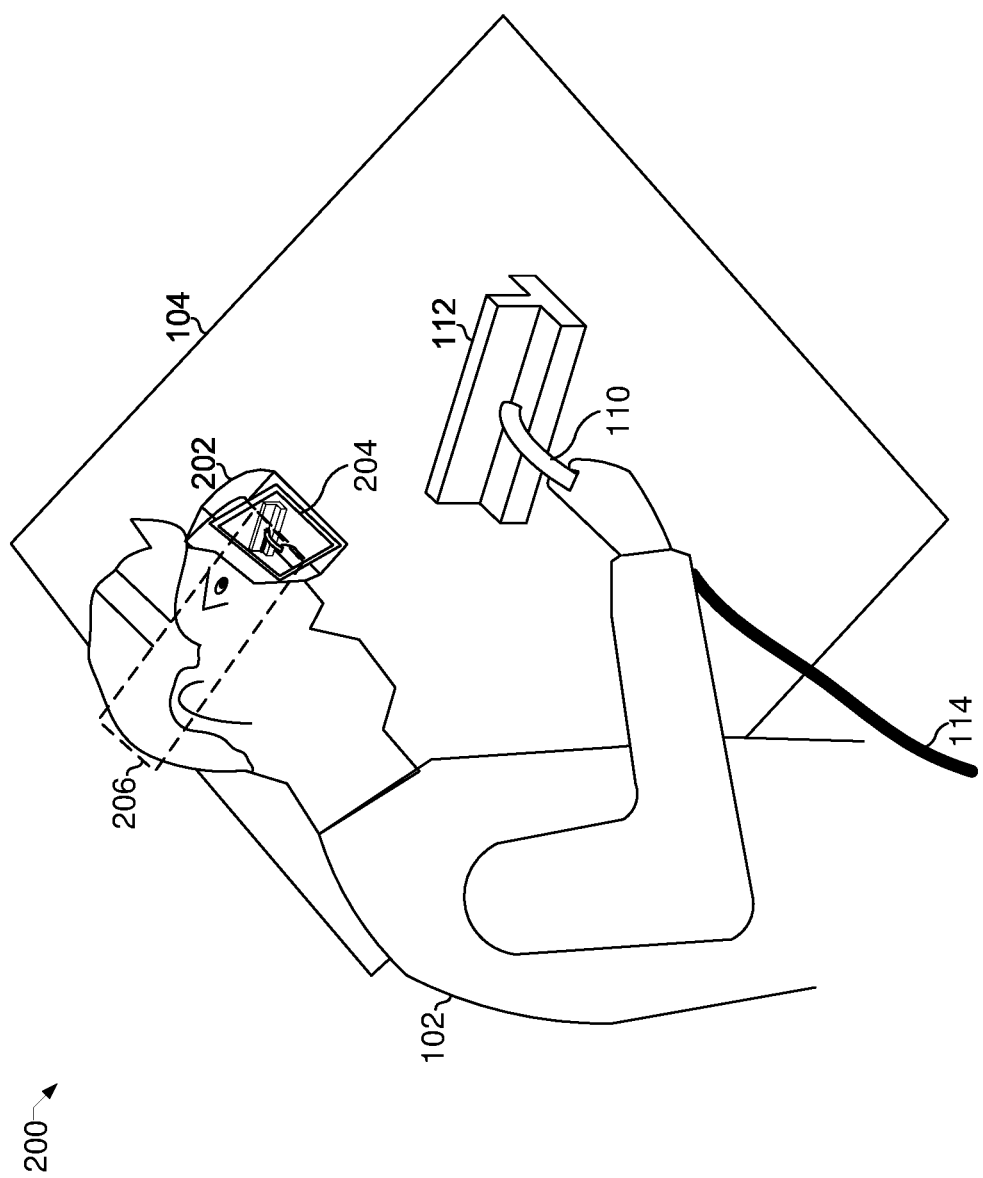
FIG. 2 is a diagram illustrating another example weld training system in accordance with aspects of this disclosure.

FIG. 2 is a diagram illustrating another example weld training system 200. The weld training system 200 of FIG. 2 includes a mounting device 202 that holds a computing device 204. Similar to the system 100 of FIG. 1, the weld training system 200 positions the computing device 204 such that the such that a camera of the computing device 204 is aimed toward the workpiece 112 and the display device of the computing device 204 is aimed toward the welder 102. However, in contrast with the system 100 of FIG. 1 where the mounting device 108 is stationary between the welder 102 and the workpiece 112, in FIG. 2 the mounting device 202 is a headset that places the computing device 204 in the line of sight of the welder 102 such that changes in the welder's viewpoint change the field of view of the camera of the computing device 204.

The mounting device 202 may include a headband 206 or other mounting system to hold the mounting device 202 and the computing device 204 on the head of the welder 102. In other examples, the mounting device 202 may integrate the computing device 204 into a welding helmet or other headwear. In other examples, the mounting device 202 may be attached to the welder's 102 clothing, helmet, and/or the like.

Figure 3:
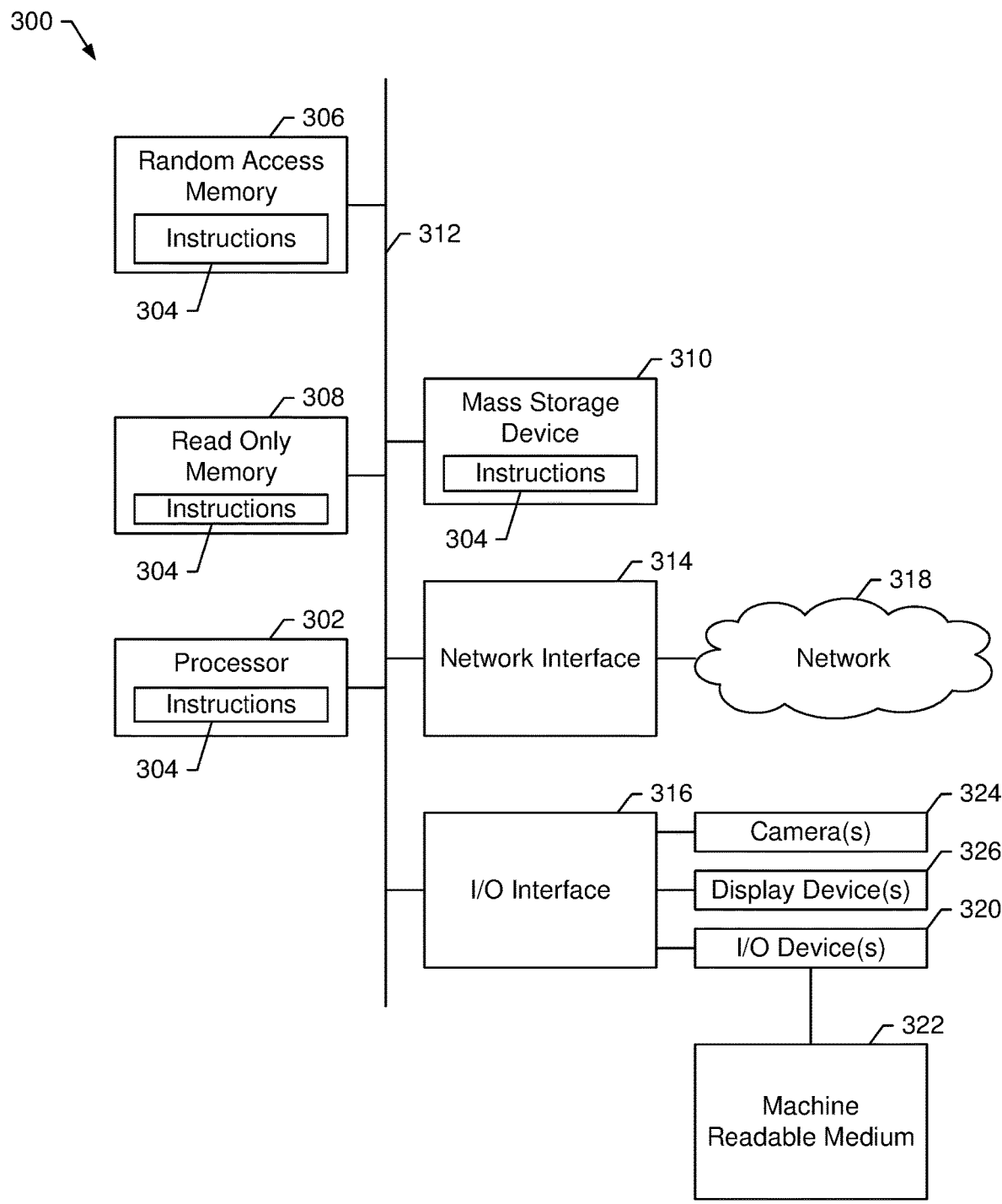
FIG. 3 is a block diagram of an example implementation of the computing device in the weld training systems of FIGS. 1 and/or 2.

FIG. 3 is a block diagram of an example implementation of a computing device 300. The example computing device 300 of FIG. 3 may be any type of system that uses a microcontroller or microprocessor to provide one or more features by executing software, firmware, and/or any other machine readable code. Example computing devices include laptop computers, tablet computers, The example computing device 300 of FIG. 3 includes a processor 302. The example processor 302 may be any specialized or general-purpose microcontroller, such as a system-on-a-chip (SoC), graphics processing unit, and/or digital signal processor, from any manufacturer. The processor 302 executes machine readable instructions 304 that may be stored locally at the processor (e.g., in an included cache), in a random access memory 306 (or other volatile memory), in a read only memory 308 (or other non-volatile memory such as FLASH memory), and/or in a mass storage device 310. The example mass storage device 310 may be a hard drive, a solid state storage drive, a hybrid drive, a RAID array, and/or any other mass data storage device.

A bus 312 enables communications between the processor 302, the RAM 306, the ROM 308, the mass storage device 310, a network interface 314, and/or an input/output interface 316.

The example network interface 314 includes hardware, firmware, and/or software to connect the computing device 300 to a communications network 318 such as the Internet. For example, the network interface 314 may include IEEE 802.X-compliant wireless and/or wired communications hardware for transmitting and/or receiving communications.

The example I/O interface 316 of FIG. 3 includes hardware, firmware, and/or software to connect one or more input/output devices 320 to the processor 302 for providing input to the processor 302 and/or providing output from the processor 302. For example, the I/O interface 316 may include a graphics processing unit for interfacing with a display device, a universal serial bus port for interfacing with one or more USB-compliant devices, a FireWire, a field bus, and/or any other type of interface. The example computing device 300 of FIG. 3 includes one or more camera(s) 324 as an input device and one or more display device(s) 326 as an output device. The camera(s) 324 may be capable of capturing stereoscopic images and/or the display device(s) 326 may be capable of displaying stereoscopic images.

The I/O device(s) 320 may also include a keyboard, a keypad, a mouse, a trackball, a pointing device, a microphone, an audio speaker, an optical media drive, a multi-touch touch screen, a gesture recognition interface, a magnetic media drive, and/or any other type of input and/or output device.

The example computing device 300 may access a non-transitory machine readable medium 322 via the I/O interface 316 and/or the I/O device(s) 320. Examples of the machine readable medium 322 of FIG. 3 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Consistent with embedded systems, one or more of the processor 302, the random access memory 306, the read-only memory 308, the mass storage device 310, the bus 312, the network interface 314, and/or the I/O interface 316 may be implemented in a single package.

Figure 4A:
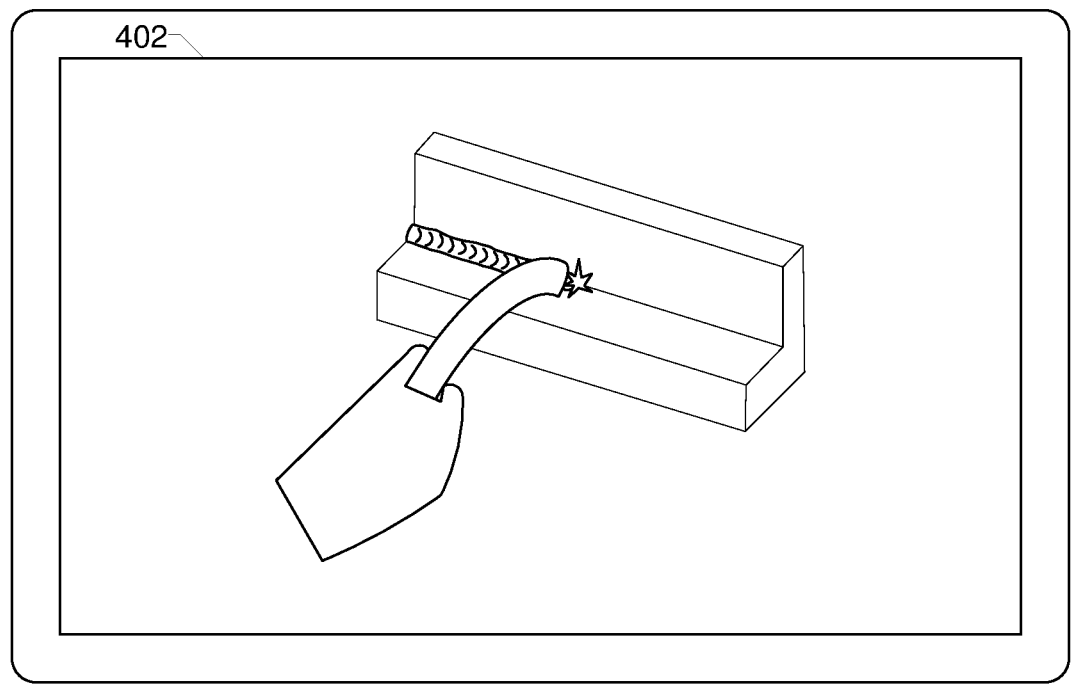
FIGS. 4A and 4B are front and rear views of an example tablet computing device that may be used to implement the computing device of any of FIGS. 1-3.
Figure 4B:
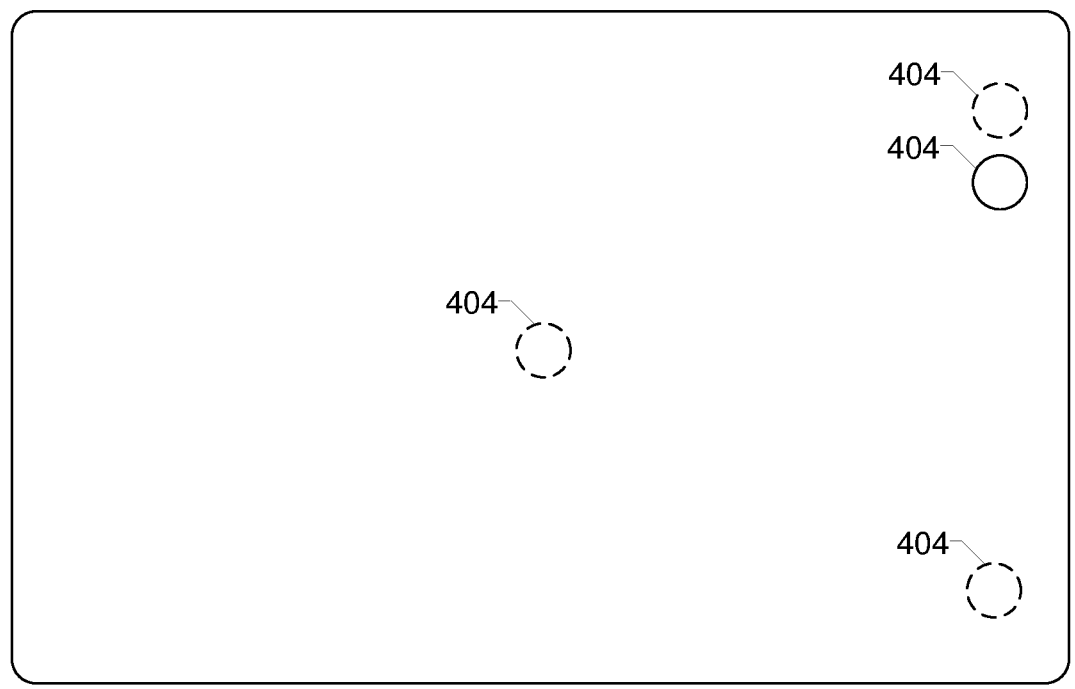

FIGS. 4A and 4B are front and rear views of an example tablet computing device 400 that may be used to implement the computing device of any of FIGS. 1-3. As illustrated in FIG. 4A, the tablet computing device 400 includes a display device 402 on a first side of the tablet computing device 400. As illustrated in FIG. 4B, the tablet computing device 400 includes one or more camera(s) 404 on a second side of the tablet computing device 404 opposite the first side shown in FIG. 4A. In this manner, the computing device 400 may be positioned in the field of view of the welder 102 to both capture images of the welding scene with the camera(s) 404 and display the resulting images on the display device 402 in to the welder 102 in real time.

Figure 5:
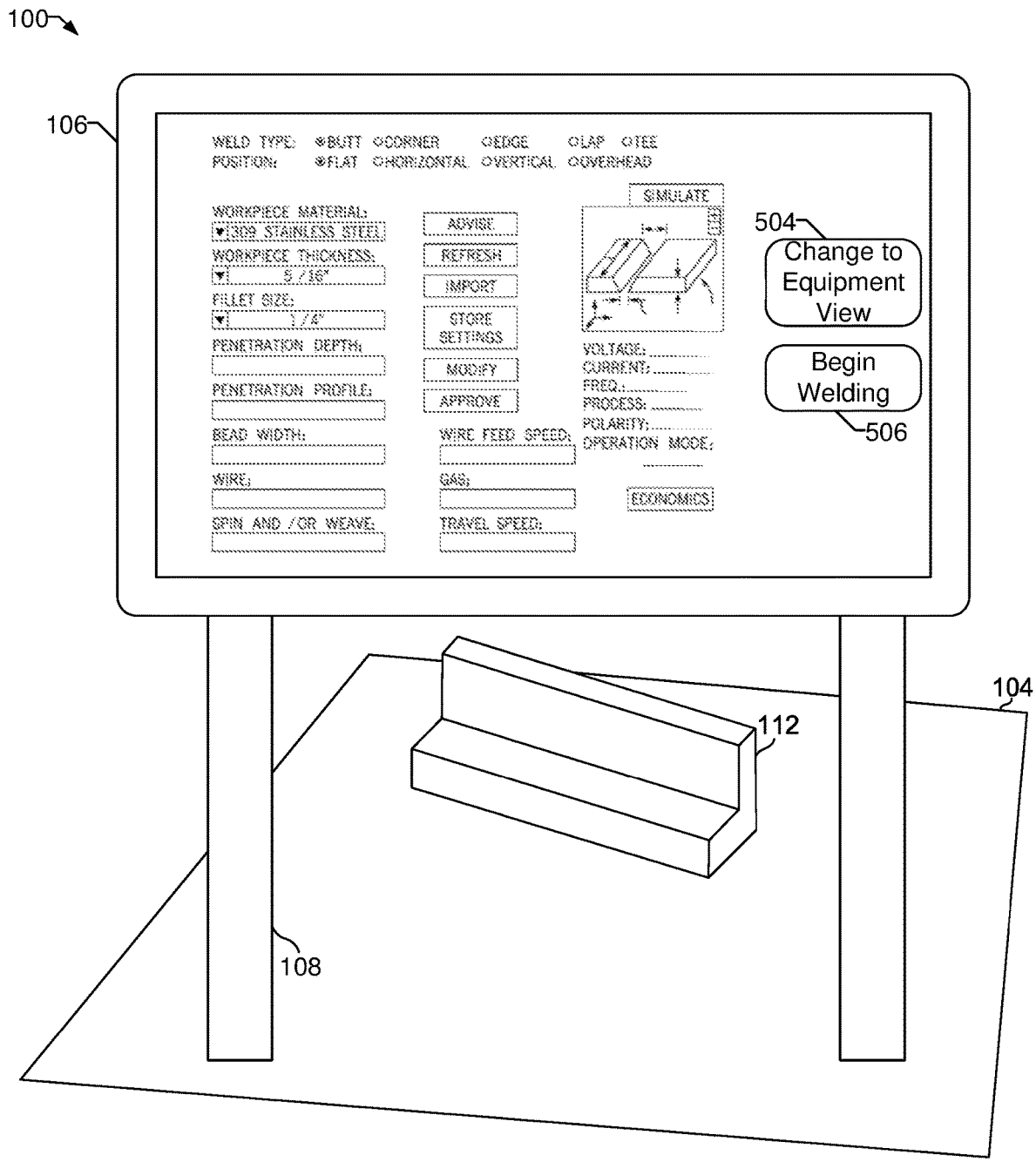
FIG. 5 is a view of the example weld training system of FIG. 1 displaying a weld calculator view to set up a training weld.

FIG. 5 is a view of the example weld training system 100 of FIG. 1 displaying a weld calculator view 502 to set up a training weld. The weld training system 100 may display the weld calculator view 502 to enable a welder to experiment with weld calculator recommendations for different combinations of physical workpiece characteristics. The weld calculator view 502 includes a button 504 to change to a weld equipment view (illustrated in FIG. 6) and a button 506 to begin a training weld (illustrated in FIG. 7).

The weld calculator view 502 includes characteristics of the joint and/or the weld, such as values for input parameters including, but not limited to, a desired fillet size, a desired penetration depth, a penetration profile, a bead width, a bevel width, a gap width, a joint length, and/or a bevel angle. The weld calculator view 502 may additionally or alternatively include inputs for wire type, wire feed speed, shielding gas type, spin or weave pattern, and/or travel speed. In some examples, the weld calculator view 502 may permit the welder to request a recommendation for weld variables such as, but are not limited to, a weld process 96, a power source voltage setting, a power source current setting, a power source frequency, a polarity, and/or an operation mode (e.g., constant current CC, constant voltage CV, or pulse).

Example systems and methods that may be used to implement the weld calculator view 502 of FIG. 5 are disclosed in Albrecht, U.S. Patent Publication No. 2015/0122781. The entirety of U.S. Patent Publication No. 2015/0122781 is incorporated herein by reference.

Figure 6:
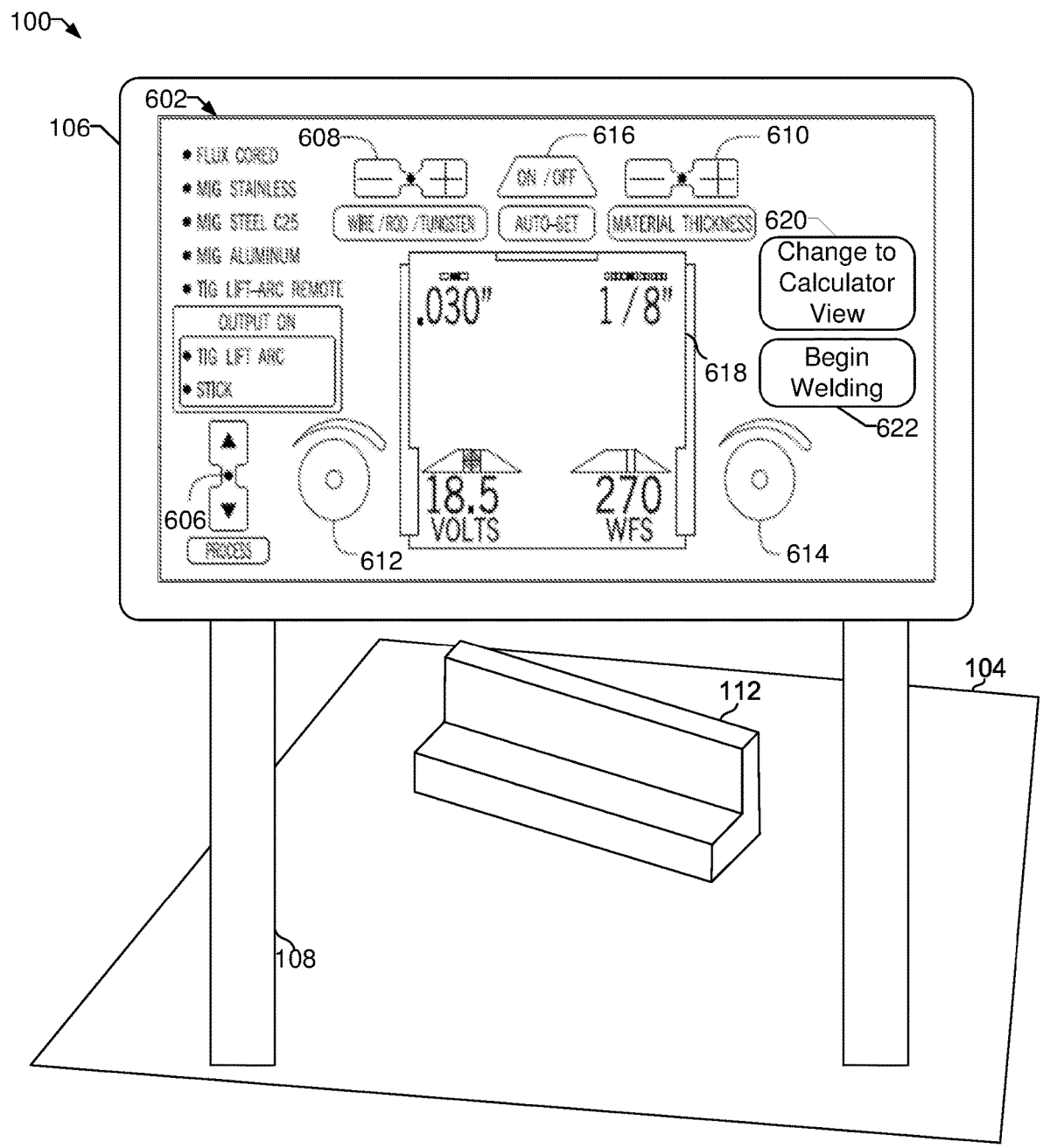
FIG. 6 is a view of the example weld training system of FIG. 1 displaying a weld equipment view to set up a training weld.

FIG. 6 is a view of the example weld training system 100 of FIG. 1 displaying a weld equipment view 602 to set up a training weld. The example weld equipment view 602 presents a simulated view of the user interface of welding equipment in a manner that is representative of how actual welding equipment would appear to the welder. The weld equipment view 602 presents a front view of the user interface 604 of an example welder. In some examples, the weld equipment view 602 may change based on a selection of a particular model of welding equipment selected. In this manner, a welder may use the weld training system 100 to become familiar with a particular piece of welding equipment and/or to become familiar with welding equipment in general.

The weld equipment view 602 includes a process input 606 to select a welding process (e.g., flux cored, MIG, TIG, stick, etc.), an electrode input 608 to select a wire/rod/tungsten type and/or size, a thickness input 610 to select a material thickness, a voltage/current dial 612, a wire feed speed dial 614, and an auto-set toggle 616. The weld equipment view 602 also includes a display 618 to output information is the information could be shown on welding equipment. While example inputs and outputs are shown for the weld equipment view 602 of FIG. 6, one or more of the inputs and/or outputs may be combined, replaced, divided, and/or otherwise modified, and/or additional inputs and/or outputs may be provided. In some examples, one or more of the inputs and/or outputs may be softkeys or other software-defined inputs that control different functions depending on the particular context.

The weld equipment view 602 includes a button 620 to change to the weld calculator view 502 described above with reference to FIG. 5, and a button 622 to begin a training weld.

Figure 7:
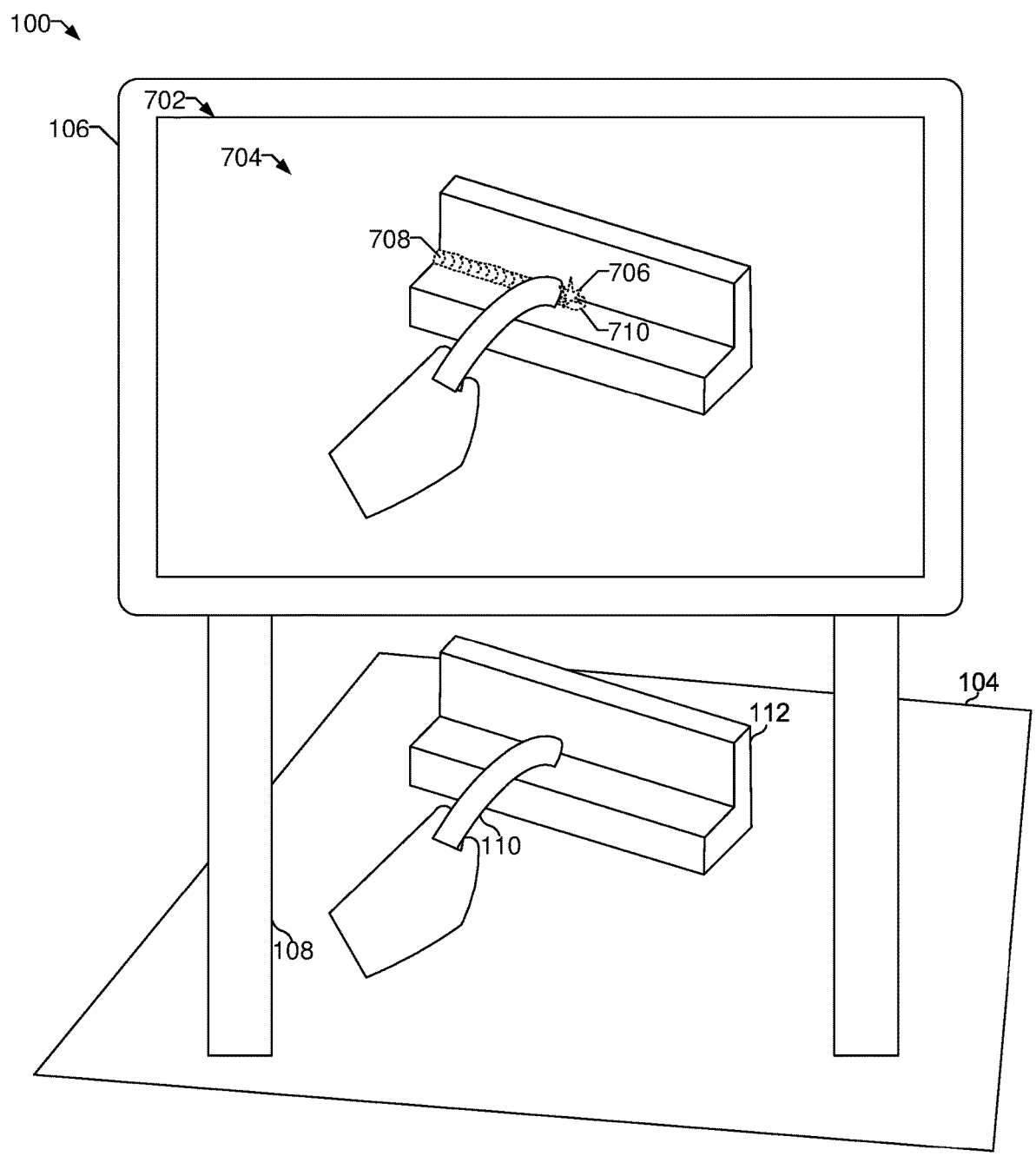
FIG. 7 is a view of the example weld training system of FIG. 1 displaying a simulated welding view based on processing images captured by the computing device during a training weld.

FIG. 7 is a view of the example weld training system of FIG. 1 displaying a simulated welding view 702 based on processing images captured by the computing device 106 during a training weld. For example, during the training weld the welder 102 attempts to perform a welding operation using the real or simulated welding torch 110 over the workpiece 112, which may include attempting to achieve a target travel speed and/or a target contact tip to work distance.

During the training weld, the computing device 106 captures images with the camera of the computing device 106 (e.g., the camera(s) 324, 404 of FIGS. 3 and/or 4B), processes the captured images to identify a first simulation device (e.g., the welding torch 110) as a simulation weld torch and a second simulation device (e.g., the workpiece 112) as a simulation workpiece, and displays images of a simulated welding operation on the display device of the computing device 106 (e.g., the display device(s) 326, 402 of FIGS. 3 and/or 4A) based on analyzing the captured images to detect indicia of weld performance. The images of the simulated welding operation displayed on the display device in the simulated welding view reflect the indicia of weld performance.

As shown in FIG. 7, there is no arc or weld bead being created by the welding torch 110 and the workpiece 112. Instead, the computing device 106 captures images of the welding torch 110 and the workpiece 112, analyzes the images (e.g., in real time) to determine the indicia of weld performance, and calculates or simulates the weld performance in real-time based on the image processing. The simulated welding view 702 displays images 704 of a simulated welding operation on the display device of the computing device 106. In the example of FIG. 7, the images 704 include the hand of the welder 102, the welding torch 110, and the workpiece 112 as captured by the camera(s). When performing a simulated weld (instead of a live weld), the images 704 also include a simulated welding arc 706, a simulated weld bead 708, and/or a simulated weld puddle 710 calculated in real-time by the computing device 106 and overlaid on the images captured by the camera(s).

Processing of captured images may include calculating a distance between the simulation welding torch 110 and the simulation workpiece 112 and/or the displaying of the images of the simulated welding operation is based on the calculated distance as the indicia of weld performance.

The simulated welding view 702 may depict welding events such as spatter, burn back, burn-through, and/or wire stubbing, based on analyzing the images captured by the camera(s) to determine the user's welding performance and/or based on weld variables.

In some examples, one or more of the sensors of the computing device 106 may be used as part of the analysis. For example, one or more of an accelerometer, a magnetometer, a microphone, or an ambient light sensor of the computing device 106 may be used to determine information about from the training weld or the computing device 106.

In other examples, the computing device 106 does not use any sensors other than the camera(s).

Figure 8:
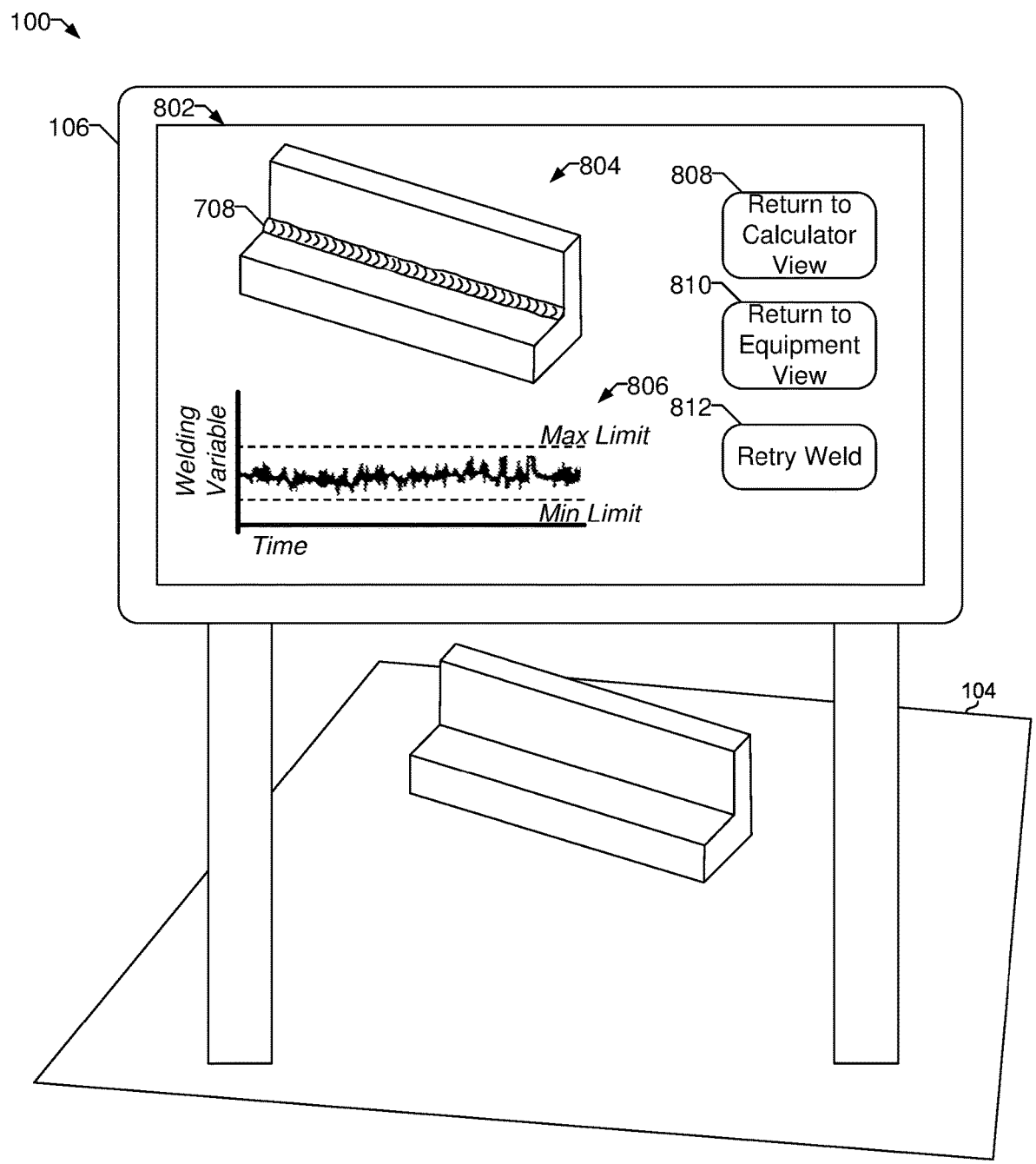
FIG. 8 a view of the example weld training system of FIG. 1 displaying a result of the training weld.

FIG. 8 illustrates a view 802 of the example weld training system 100 of FIG. 1 displaying a result of the training weld. The example view 802 includes an image 804 of the simulated weld calculated during the training weld, and a graph 806 of one or more weld variables and/or performance scores. The view 802 may present and/or highlight calculated or simulated defects based on the weld performance during the training weld.

The example welding parameter is graphed in FIG. 8 is presented in relation to the calculated weld bead 708 on the workpiece 112. As illustrated in the graph 806, the welding variable resides between maximum and minimum limit values Accordingly, no defects are displayed or anticipated in the weld bead 708 in the view 802 of FIG. 8.

The example view 802 includes a button 808 to enable the welder 102 to return to the weld calculator view 502 of FIG. 5 to adjust the weld settings, a button 810 to enable the welder 102 to return to the weld equipment view 602 of FIG. 6 to adjust the weld settings, and/or a button 812 to retry to the training weld with the same weld settings.

Figure 9:
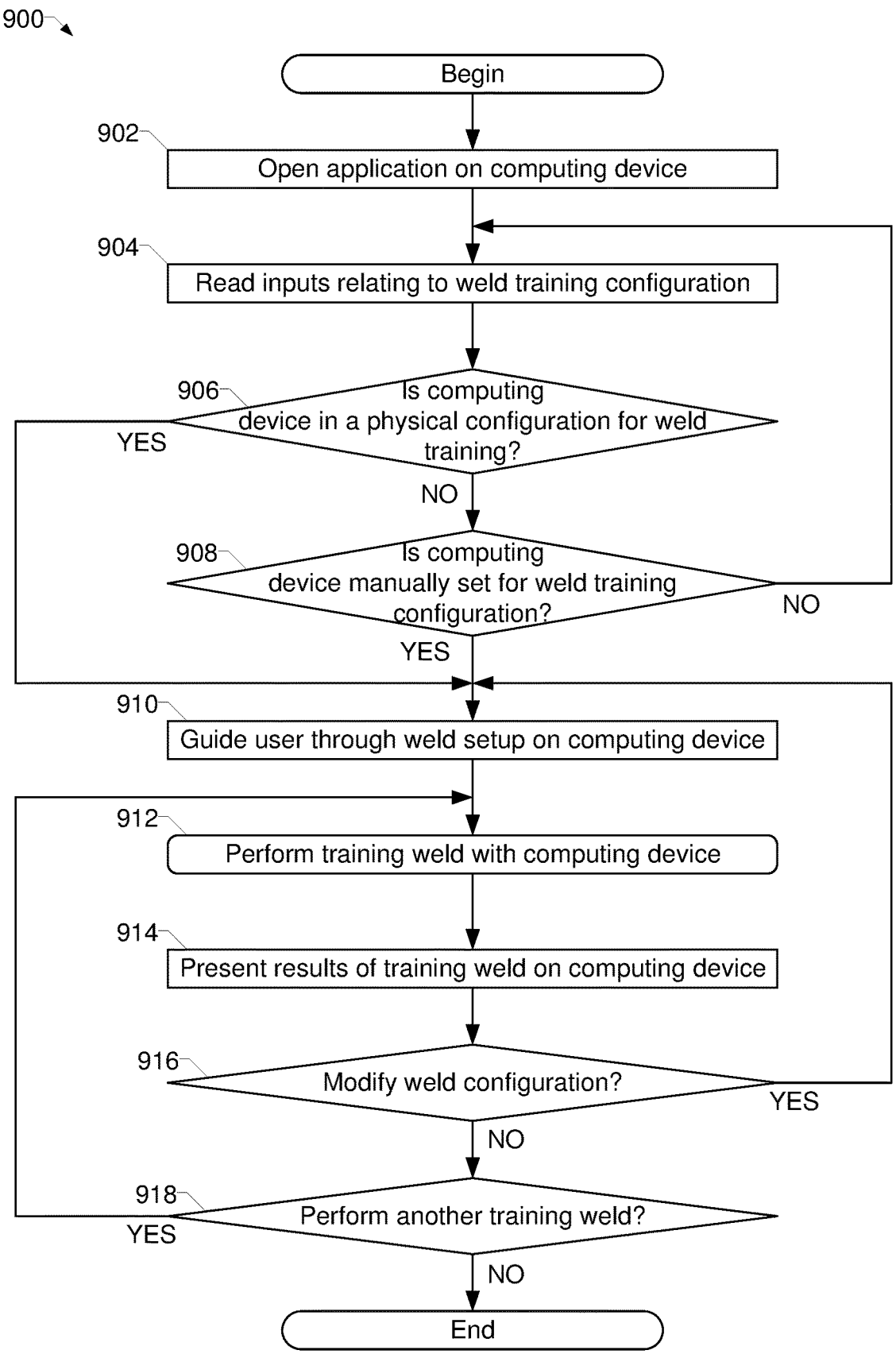
FIG. 9 is a flowchart representative of example machine readable instructions which may be executed to implement the weld training system of FIGS. 1 and/or 2 to provide weld training.

FIG. 9 is a flowchart representative of example machine readable instructions 900 which may be executed to implement the weld training systems 100, 200 of FIGS. 1 and/or 2 to provide weld training. For example, the instructions 900 may be stored in one or more of the storage devices 306, 308, 310 and/or executed on the processor 302 of FIG. 3.

At block 902, an application (or "app") is opened on the computing device 106. For example, the welder 102 may select an app and/or the computing device 106 may recognize that the computing device 106 has been attached to the mounting device 108 and automatically open the app in response.

At block 904, the computing device 106 reads inputs relating to a weld training configuration. For example, the computing device 106 may read one or more sensors, such as an accelerometer, to determine whether the computing device 106 is oriented correctly for performing weld training. A correct orientation may be useful to ensure that a training weld is captured and displayed to the welder 102.

At block 906, the computing device 106 determines whether the computing device 106 is in a physical configuration (e.g., orientation) for weld training. A physical orientation for weld training may include being attached to the mounting device 108 and/or being oriented at a correct angle relative to gravity. If the computing device 106 is not in a physical configuration for weld training (block 906), at block 908 the computing device 106 determines whether the computing device 106 has been manually set for a weld training configuration. For example, the welder 102 may instruct the computing device 106 to enter a weld training mode even if the computing device 106 is not in a particular orientation. If the computing device 106 has not been manually set for a weld training configuration (block 908), control returns to block 904.

If the computing device 106 is in a physical configuration for weld training (block 906) or the computing device 106 has been manually set for a weld training configuration (block 908), at block 910 the computing device 106 guides the user through weld setup on the computing device 106. For example, the computing device 106 may present the weld calculator view 502 and/or the weld equipment view 602 of FIGS. 5 and/or 6 to enable the user to set up parameters for a training weld.

At block 912, the computing device 106 performs weld training analysis and presentation. For example, while the welder 102 performs a training weld, the computing device 106 capture images with camera(s) of the computing device 106, processes the captured images to identify a first simulation device (e.g., the weld torch 110) as a simulation weld torch and a second simulation device (e.g., the workpiece 112) as a simulation workpiece, and displays images of a simulated welding operation on the display device (e.g., the view 702 of FIG. 7) of the computing device 106 based on analyzing the captured images (e.g., in real-time) to detect indicia of weld performance, where the images of the simulated welding operation reflect the indicia of weld performance Example instructions to implement block 912 are described below with reference to FIG. 10.

At block 914, after the training weld is completed, the computing device 106 presents results of the training weld (e.g., in the view 802 of FIG. 8). In some examples, the computing device 106 may identify suggestions or hints to the welder 102 for improving the weld based on the selected weld parameters and/or the welder's performance during the training weld. Example suggestions may include changing one or more of the weld parameters and/or changing one or more aspects of the welder's technique.

At block 916, the computing device 106 determines whether the weld configuration is to be modified, such as in response to a selection of the buttons 808, 810 to return to the weld calculator view 502 and/or the weld equipment view 602. If the weld configuration is to be modified (block 916), control returns to block 910.

If the weld configuration is not to be modified (block 916), at block 918 the computing device 106 determines whether another training weld is to be performed with the same settings. If another training weld is to be performed (block 918), control returns to block 912. If no further training welds are to be performed (block 918), the example instructions 900 may end.

Figure 10:
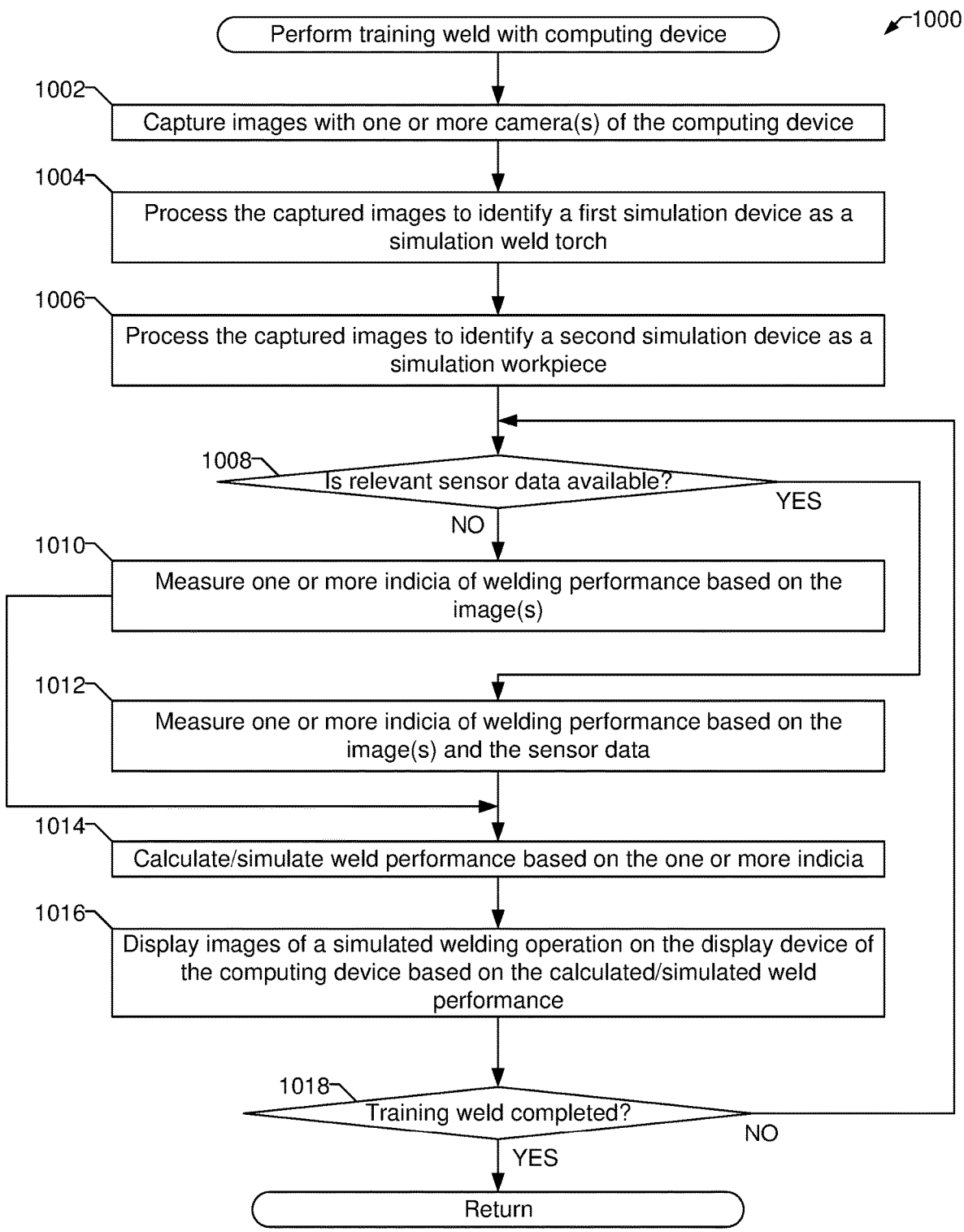
FIG. 10 is a flowchart representative of example machine readable instructions which may be executed to implement the weld training system of FIGS. 1 and/or 2 to perform a training weld with a computing device.

FIG. 10 is a flowchart representative of example machine readable instructions 1000 which may be executed to implement the weld training systems 100, 200 of FIGS. 1 and/or 2 to perform a training weld with a computing device. The instructions 1000 of FIG. 10 may be executed to implement block 912 of FIG. 9 to perform a training weld with the computing device 106. The instructions 1000 may begin, for example, after a user accepts a set of weld parameters in block 910.

At block 1002, the computing device 106 captures images with one or more camera(s) of the computing device 106. For example, the computing device 106 may capture the images using the camera(s) 322, 404 of FIGS. 3 and/or 4B.

At block 1004, the computing device 106 processes the captured images to identify a first simulation device as a simulation weld torch. In some examples, the computing device 106 may use image processing techniques to identify the welding torch 110 as a device held by the user's hand and/or as having distinct markings identifying the device as a welding torch.

At block 1006, the computing device 106 processes the captured images to identify a second simulation device as a simulation workpiece. For example, the computing device 106 may use image processing techniques to identify the workpiece 112 as having a particular shape, as an object distinct from a background or other surface on which the object is resting, and/or as having distinct markings identifying the device as a workpiece.

At block 1008, the computing device 106 determines whether sensor data is available that is relevant to the training weld. For example, relevant sensor data may include accelerometer and/or gyroscope data to determine an orientation and/or movement of the computing device 106 (e.g., if the computing device is mounted to the headwear of the welder 102). If relevant sensor data is not available (block 1008), at block 1010 the computing device 106 measures one or more indicia of welding performance based on the images captured by the camera(s). For example, the computing device 106 may calculate indicia such as aim, speed, work angle, travel angle, and/or contact tip to work distance using the images.

On the other hand, if relevant sensor data is available (block 1008), at block 1012 the computing device 106 measures one or more indicia of welding performance based on the images captured by the camera(s) and based on the sensor data.

After measuring the one or more indicia at block 1010 or block 1012, at block 1014 the computing device 106 calculates/simulates weld performance based on the measured one or more indicia. For example, the computing device 106 may use a model to calculate a weld result using the measured indicia, such as aim, travel speed, work angle, travel angle, and/or contact tip to work distance, and/or the selected weld parameters as inputs to the model.

At block 1016, the computing device 106 displays images of a simulated welding operation on the display device (e.g., the display devices 326, 402 of FIGS. 3 and/or 4A). The images of the simulated welding operation are determined in real-time during the training weld based on the calculated or simulated weld performance. Thus, the example computing device 106 may depict spatter, flares, stubbing, and/or any other welding events based on the measured and calculated performance, and based on the appropriateness of the selected weld parameters to the type of weld being performed.

At block 1018, the computing device 106 determines whether the training weld is complete. If the training weld is not complete (block 1018), control returns to block 1008 to continue monitoring the training weld. When the training weld is complete (block 1018), the example instructions 1000 end and control returns to block 914 of FIG. 9.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A weld training system, comprising:
    a computing device comprising a display device on a first side and a camera on a second side, the computing device configured to:
        capture images with the camera;
        process the captured images to identify a first simulation device as a simulation weld torch and a second simulation device as a simulation workpiece; and
        display images of a simulated welding operation on the display device of the computing device based on analyzing the captured images to detect indicia of weld performance, the images of the simulated welding operation reflecting the indicia of weld performance; and
    a mounting device configured to removably hold the computing device to orient the camera of the computing device toward a simulation area.

2. The weld training system as defined in claim 1, wherein the mounting device is configured to orient the display device of the computing device away from the simulation area.

3. The weld training system as defined in claim 1, wherein the mounting device is configured to orient the display device such that a user of the first simulation device is facing the simulation area.

4. A weld training system, comprising:
    a computing device comprising a display device on a first side and a camera on a second side, the computing device configured to:
        capture images with the camera;
        process the captured images to identify a first simulation device as a simulation weld torch and a second simulation device as a simulation workpiece; and
        display images of a simulated welding operation on the display device of the computing device based on analyzing the captured images to detect indicia of weld performance, the images of the simulated welding operation reflecting the indicia of weld performance; and a mounting device configured to removably hold the computing device to orient the camera of the computing device toward a simulation area, wherein the computing device is configured to recognize when the computing device is connected to the mounting device.

5. The weld training system as defined in claim 1, wherein the mounting device comprises a protective housing to prevent damage to the computing device from an actual weld.

6. The weld training system as defined in claim 1, wherein the processing of the captured images comprises calculating a distance between the first simulation device and the second simulation device.

7. The weld training system as defined in claim 6, wherein the displaying of the images of the simulated welding operation is based on the calculated distance as the indicia of weld performance.

8. The weld training system as defined in claim 1, wherein the computing device is configured to enable selection of one or more weld variables.

9. The weld training system as defined in claim 8, wherein the computing device is configured to depict welding events including at least one of spatter, burn back, burn-through, or wire stubbing, based on at least one of the indicia of weld performance or the one or more weld variables.

10. The weld training system as defined in claim 8, wherein the computing device is configured to enable the selection of the one or more weld variables with at least one of a weld calculator view or a weld equipment view.

11. The weld training system as defined in claim 1, wherein the computing device is configured to process the captured images based on input from a sensor of the computing device.

12. The weld training system as defined in claim 11, wherein the sensor comprises at least one of an accelerometer, a magnetometer, a microphone, or an ambient light sensor.

13. The weld training system as defined in claim 1, further comprising a plurality of cameras configured to capture images substantially simultaneously.

14. The weld training system as defined in claim 1, wherein the computing device is a smartphone or a tablet computer.

15. The weld training system as defined in claim 1, wherein the computing device is configured to process the captured images without using additional sensors.

16. The weld training system as defined in claim 1, wherein the camera is configured to generate stereoscopic images and the display device is configured to display the stereoscopic images.

17. The weld training system as defined in claim 1, wherein the indicia of weld performance comprise at least one of aim, travel speed, work angle, travel angle, or contact tip to work distance.

18. A weld training system, comprising:
a computing device comprising a display device on a first side and a camera on a second side, the computing device comprising a processor configured to:
capture images with the camera;
process the captured images to identify a first simulation device as a simulation weld torch and a second simulation device as a simulation workpiece; and
display images of a simulated welding operation on the display device of the computing device based on analyzing the captured images to detect indicia of weld performance, the images of the simulated welding operation reflecting the indicia of weld performance, wherein the computing device is one of a smartphone or a tablet computer; and
a mounting device configured to removably hold the computing device to orient the camera of the computing device toward a simulation area.

19. The weld training system as defined in claim 18, wherein the computing device comprises a touchscreen, and the processor is configured to receive input parameters via the touchscreen.

* * * * *